United States Patent
Turney et al.

(10) Patent No.: US 10,816,282 B2
(45) Date of Patent: Oct. 27, 2020

(54) FLUID FLOW MANAGEMENT ASSEMBLY FOR HEAT EXCHANGER

(71) Applicant: Hamilton Sundstrand Corporation, Charlotte, NC (US)

(72) Inventors: Joseph Turney, Amston, CT (US); John H. Whiton, South Windsor, CT (US); James Streeter, Torrington, CT (US)

(73) Assignee: HAMILTON SUNSTRAND CORPORATION, Charlotte, NC (US)

( * ) Notice: Subject to any disclaimer, the term of this patent is extended or adjusted under 35 U.S.C. 154(b) by 59 days.

(21) Appl. No.: 16/128,903

(22) Filed: Sep. 12, 2018

(65) Prior Publication Data

US 2020/0080798 A1 Mar. 12, 2020

(51) Int. Cl.
| F28F 9/00 | (2006.01) |
| F28F 9/02 | (2006.01) |
| B23P 15/26 | (2006.01) |
| F28F 9/22 | (2006.01) |

(52) U.S. Cl.
CPC .............. *F28F 9/027* (2013.01); *B23P 15/26* (2013.01); *F28F 9/026* (2013.01); *F28F 9/0246* (2013.01); *F28F 9/0282* (2013.01); *F28F 2009/222* (2013.01)

(58) Field of Classification Search
CPC .......... F28F 9/027; F28F 9/0246; B23P 15/26
See application file for complete search history.

(56) References Cited

U.S. PATENT DOCUMENTS

| 5,941,303 A | 8/1999 | Gowan et al. |
| 8,376,035 B2 | 2/2013 | Howard et al. |
| 2008/0164006 A1* | 7/2008 | Karamanos ........... F24F 1/0059 165/67 |
| 2013/0264031 A1 | 10/2013 | Plourde et al. |
| 2017/0146305 A1 | 5/2017 | Kuczek et al. |
| 2017/0198977 A1 | 7/2017 | Herring et al. |
| 2017/0198978 A1 | 7/2017 | Kuczek et al. |
| 2017/0198979 A1 | 7/2017 | St. Rock et al. |
| 2017/0363361 A1 | 12/2017 | Turney |
| 2018/0195813 A1 | 7/2018 | Turney et al. |
| 2019/0093605 A1* | 3/2019 | Rixon ................... F28F 9/0248 |

FOREIGN PATENT DOCUMENTS

| DE | 243088 A1 | 2/1987 |
| DE | 4333904 A1 | 3/1995 |
| EP | 3193123 B1 | 7/2017 |
| EP | 3225948 B1 | 10/2017 |
| EP | 3293478 A1 | 3/2018 |
| WO | 9410520 A1 | 5/1994 |

OTHER PUBLICATIONS

European Search Report for Application No. 19196773.6, dated Feb. 12, 2020, 7 pages.

* cited by examiner

*Primary Examiner* — Filip Zec
(74) *Attorney, Agent, or Firm* — Cantor Colburn LLP

(57) ABSTRACT

A heat exchanger includes a core section defining a plurality of first fluid channels and a plurality of second fluid channels. The heat exchanger also includes a header section defining a plurality of first fluid layers and a plurality of second fluid layers. The heat exchanger further includes a transition region located between the header section and the core section, the transition region fluidly coupling the plurality of first fluid layers to the first fluid channels, each of the first fluid layers routing a first fluid to a respective group of first fluid channels.

12 Claims, 5 Drawing Sheets

FLUID FLOW MANAGEMENT ASSEMBLY FOR HEAT EXCHANGER

BACKGROUND

The embodiments herein relate to heat exchangers and, more particularly, to a fluid flow management assembly for a counter flow heat exchanger.

Heat exchangers are central to the functionality of numerous systems in engines and environmental controls systems, among other applications. On engines, heat exchangers are used for a variety of oil and air cooling applications. Heat exchangers are central to the operation of environmental control systems (air cycles) as well as other cooling systems. Such applications continually require increases in heat transfer performance, reductions in pressure loss, and reductions in size and weight. Current heat exchanger offerings are dominated by plate fin construction, with tube shell and plate-type heat exchangers having niche applications. Traditional plate fin construction imposes multiple design constraints that inhibit performance, increase size and weight, suffer structural reliability issues, are unable to meet future high temperature applications, and limit system integration opportunities.

In conventional counter-flow heat exchangers, transitioning from pipe flow to a layered arrangement requires special headering techniques and can significantly impact the overall performance.

BRIEF DESCRIPTION

Disclosed is a heat exchanger. The heat exchanger includes a core section defining a plurality of first fluid channels and a plurality of second fluid channels. The heat exchanger also includes a header section defining a plurality of first fluid layers and a plurality of second fluid layers. The heat exchanger further includes a transition region located between the header section and the core section, the transition region fluidly coupling the plurality of first fluid layers to the first fluid channels, each of the first fluid layers routing a first fluid to a respective group of first fluid channels.

Also disclosed is a method of managing fluid flow in a heat exchanger. The method includes routing a first fluid from a pipe inlet of the heat exchanger to a plurality of first fluid slots. The method also includes routing the first fluid from each first fluid slot to a respective group of first fluid flow channels.

Further disclosed is a method of manufacturing a heat exchanger. The method includes additively manufacturing a core section, a header section and a transition region, the core section defining a plurality of first fluid channels and a plurality of second fluid channels, the header section defining a plurality of first fluid layers and a plurality of second fluid layers, and the transition region located between the header section and the core section, the transition region fluidly coupling the plurality of first fluid layers to the first fluid channels, each of the first fluid layers routing a first fluid to a respective group of first fluid channels.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
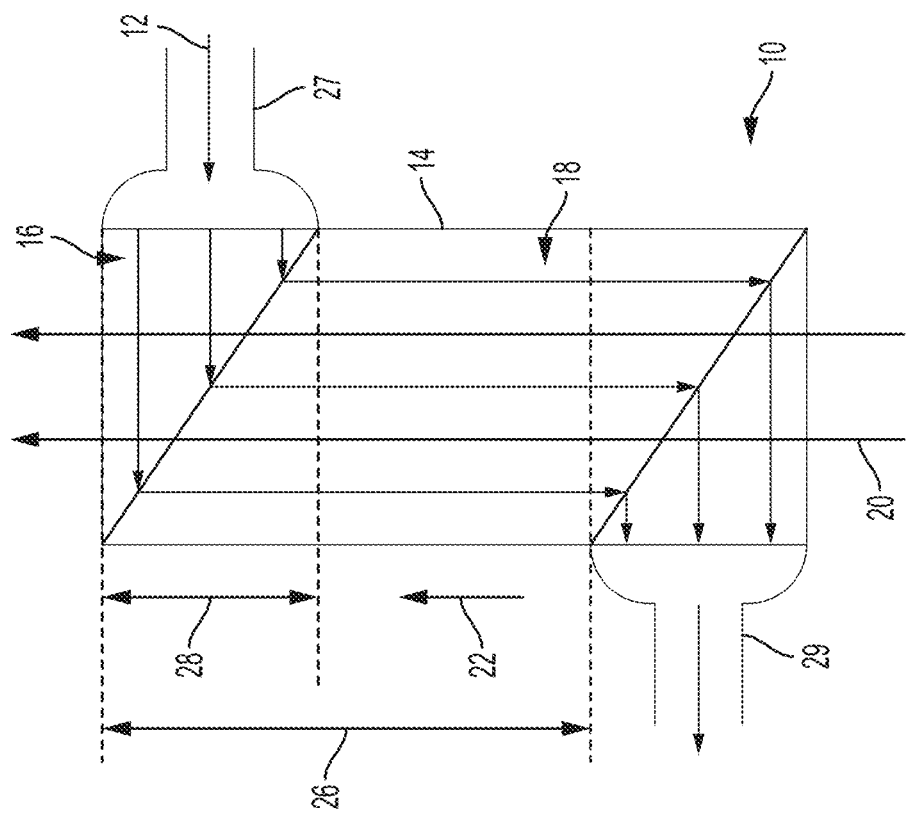
FIG. 1 is a schematic illustration of a counter flow heat exchanger.

Referring to FIG. 1, a counter flow heat exchanger is schematically illustrated and referenced generally with numeral 10. In the illustrated embodiment, a first fluid flow 12 (e.g., hot flow) enters the heat exchanger 10 from first side 14 of the heat exchanger 10 and goes through a mitered bend in a header section 16 (also may be referred to as a tent section) to enter a core section 18. A second fluid flow 20 (e.g., cold flow), goes straight through a longitudinal direction 22 of the heat exchanger 10. Another mitered bend on the hot side exists at an outlet 24 of the core section 18. The inlet and outlet of the first fluid may be an inlet pipe 27 and an outlet pipe 29, as shown.

Since the most effective part of the heat exchanger 10 is the core section 18, it is desirable to maximize the core flow length 26 while minimizing the tent length 28. The tent length 28 is typically set based on the overall hot side pressure drop requirements, i.e. as the tent length decreases the hot side pressure drop increases. Therefore, successfully minimizing the pressure drop in the header section 16 will allow for a smaller, more compact overall heat exchanger 10. The embodiments described herein further this effort with a fluid flow management assembly that reduces the tent length 28. It is to be appreciated that the fluid management scheme may be utilized with several types of heat exchangers, including additively manufactured, plate-fin, counter flow, and parallel flow heat exchangers.

Figure 3:
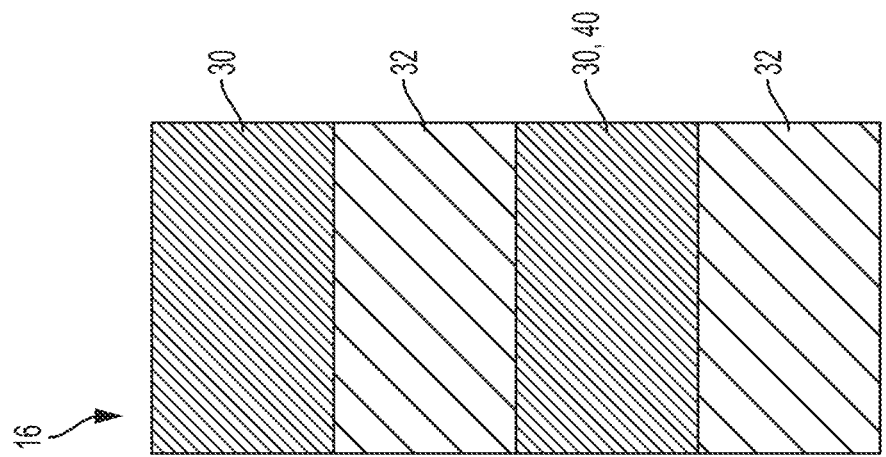
FIG. 3 is a cross-sectional view of a header section of the heat exchanger.
Figure 2:
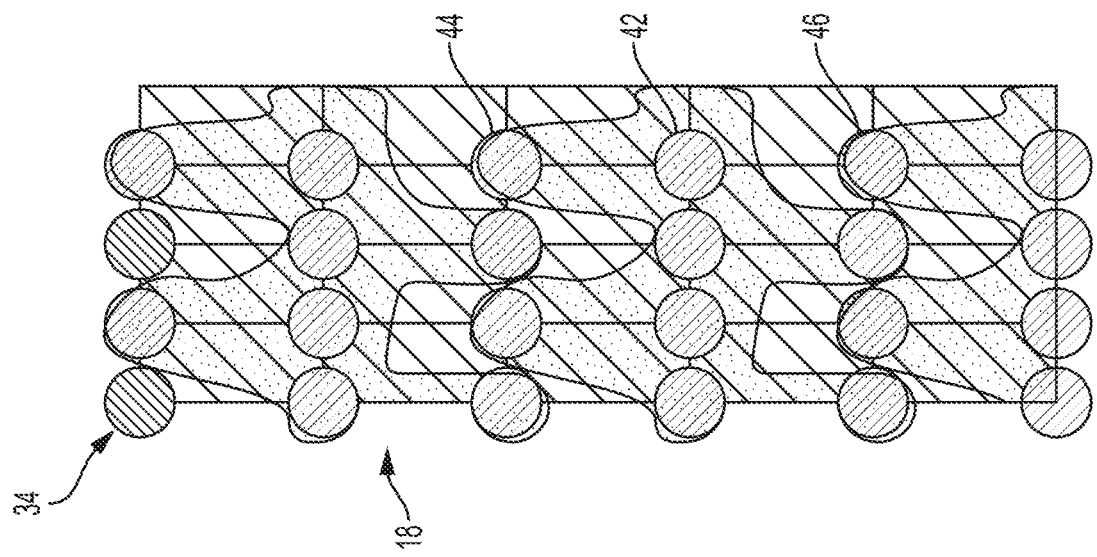
FIG. 2 is a cross-sectional view of a core section of the heat exchanger.
Figure 5:
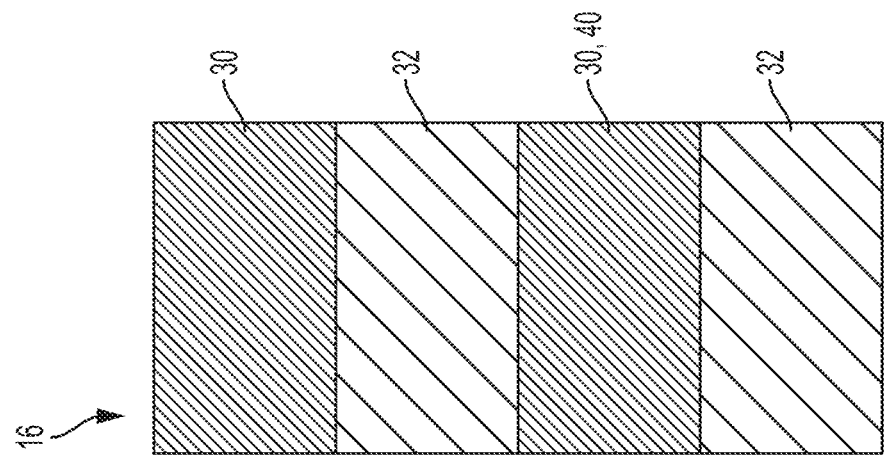
FIG. 5 is a cross-sectional view of a header section of the heat exchanger according to another aspect of the disclosure.

Referring now to FIGS. 2 and 3, the fluid flow management assembly is illustrated. FIG. 3 illustrates a sectional view of the header section 16. The header section 16 is arranged in layers of the first fluid and the second fluid (e.g., hot and cold flow). For illustration purposes, two sets of alternating layers are shown. In particular, two layers of hot flow layers 30 are shown and two layers of cold flow layers 32 are shown. As one can appreciate, any number of layers are contemplated, which may vary depending upon the particular application of use.

Figure 4:
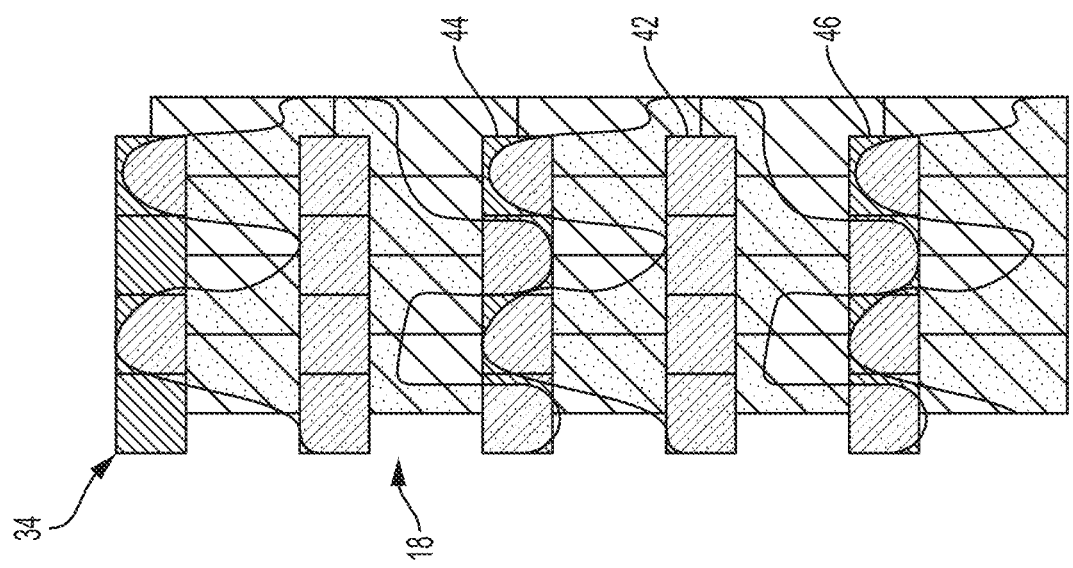
FIG. 4 is a cross-sectional view of a core section of the heat exchanger according to another aspect of the disclosure.

The layers are slots or a similar geometry that route the respective fluids from a main inlet (e.g., inlet pipe) to the core section 18. The terms "layer" and "slot" may be used interchangeably herein. Each slot layer 30, 32 is split to gradually transition from the main inlet to the core section 18 with a plurality of channels 34 of the core section 18 and merged again at outlets to transition back to pipes. The slot layers 30, 32 have a cross-sectional area that is larger than a cross-sectional area of each of the plurality of channels 34. The slots 30, 32 are positioned just upstream of the core section 18 of the heat exchanger 10. In the illustrated embodiment of FIG. 2, the channels 34 have a substantially circular cross-section, but it is to be appreciated that various alternative cross-sectional geometries may be employed in some embodiments. As one example, the channels 34 may have a rectangular cross-section, as shown in FIG. 4, but it is to be understood that the illustrated examples are not exhaustive of the channel geometries that may be utilized. Additionally, the cross-sectional geometry of the channels may or may not be uniform.

Figure 7:
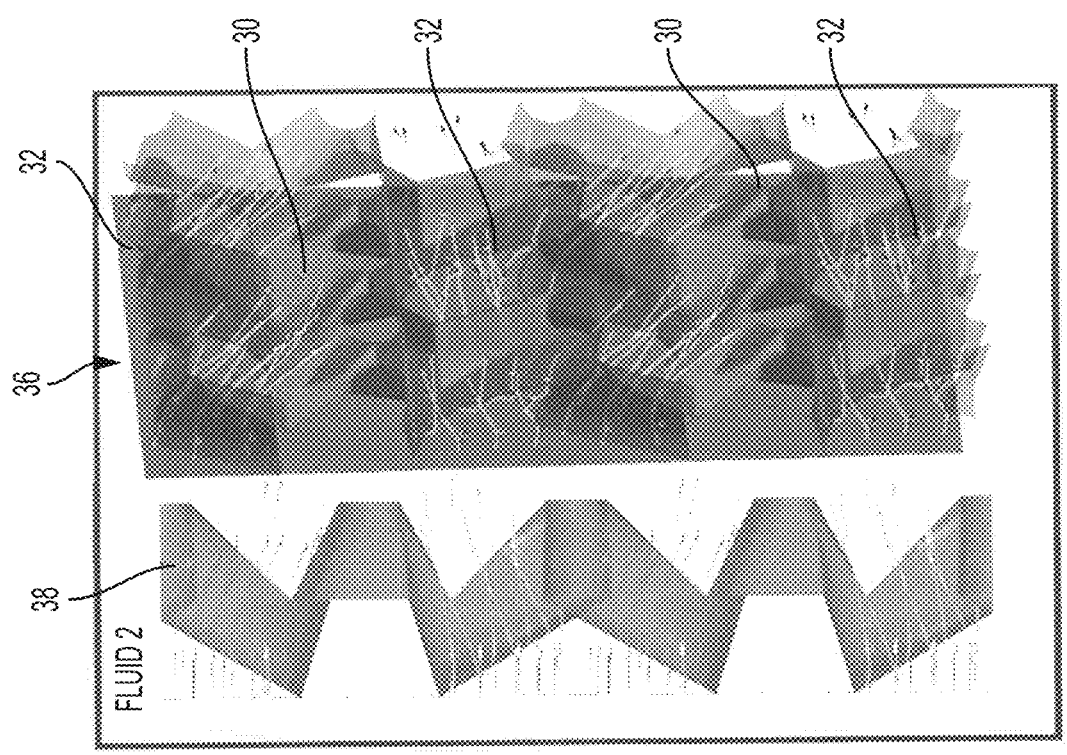
FIG. 7 illustrates a flow path of a second fluid through the transition section of the heat exchanger.
Figure 6:
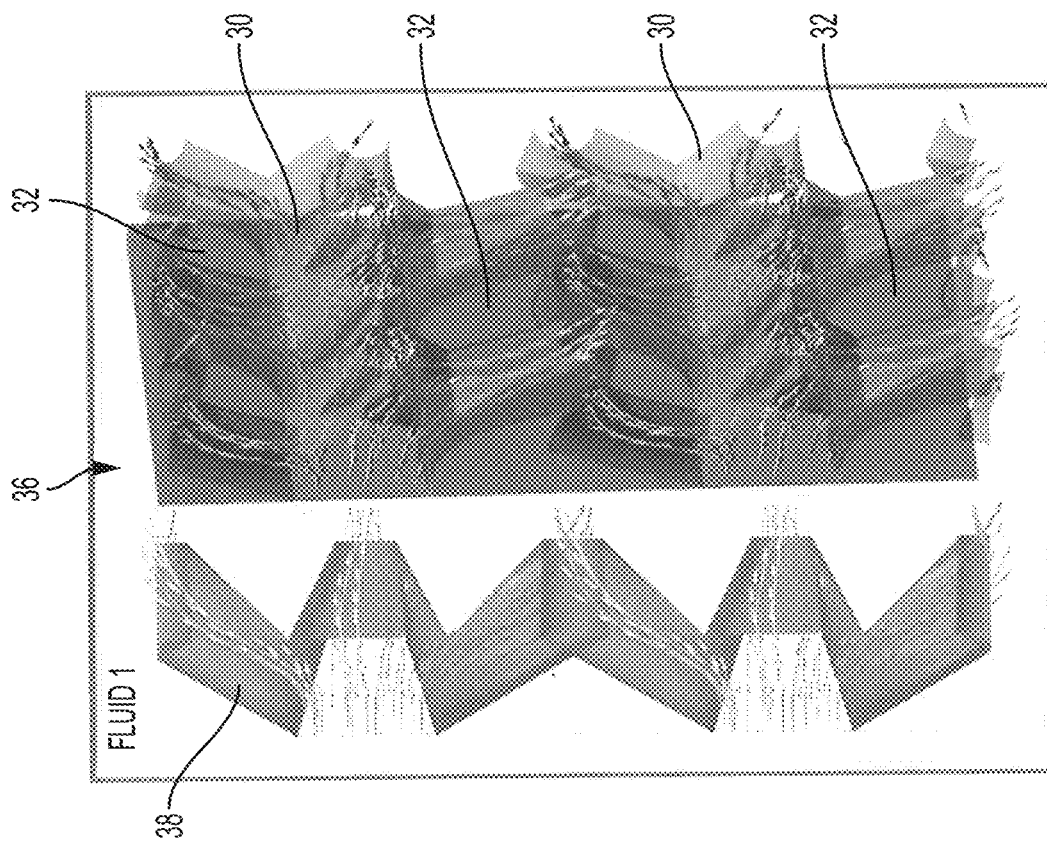
FIG. 6 illustrates a flow path of a first fluid through a transition section of the heat exchanger.

Referring to FIGS. 6 and 7, a transition region 36 is located between the slots 30, 32 and the channels 34. The transition region 36 includes at least one wall 38 that directs flow from each slot to respective channels downstream of the slots and isolates the hot fluid flow from the cold fluid flow. In particular, each hot flow layer 30 routes the hot fluid through the transition region 36 and to a respective group of channels 34. As shown in FIGS. 2 and 4, the channels 34 are arranged in rows, and in the illustrated embodiments each slot 30 feeds the hot fluid to an entire row of channels that the slot is centrally aligned with. Each slot 30 also feeds the hot fluid to some of the channels from rows of channels adjacent to the centrally aligned row that is fully fed the hot fluid. By way of example, one of the slots 30 is also labeled with numeral 40. Slot 40 is positioned to be in fluid communication with channel row 42 and some of the channels of channel rows 44 and 46. In the illustrated example, half of adjacent channel rows 44, 46 are fed the hot fluid from slot 40. The groups of channels fed by a single slot are indicated in FIGS. 2 and 4 with semi-transparent shapes. The slots 30, 32 are sized such that the total flow area for each fluid is roughly constant in some embodiments, but the slot area would be sized based on pressure drop requirements of a particular application. The fluid flow profile for each fluid is illustrated in FIGS. 6 and 7, with FIG. 6 showing the fluid flow for the hot fluid and FIG. 7 showing the fluid flow for the cold fluid.

Figure 8:
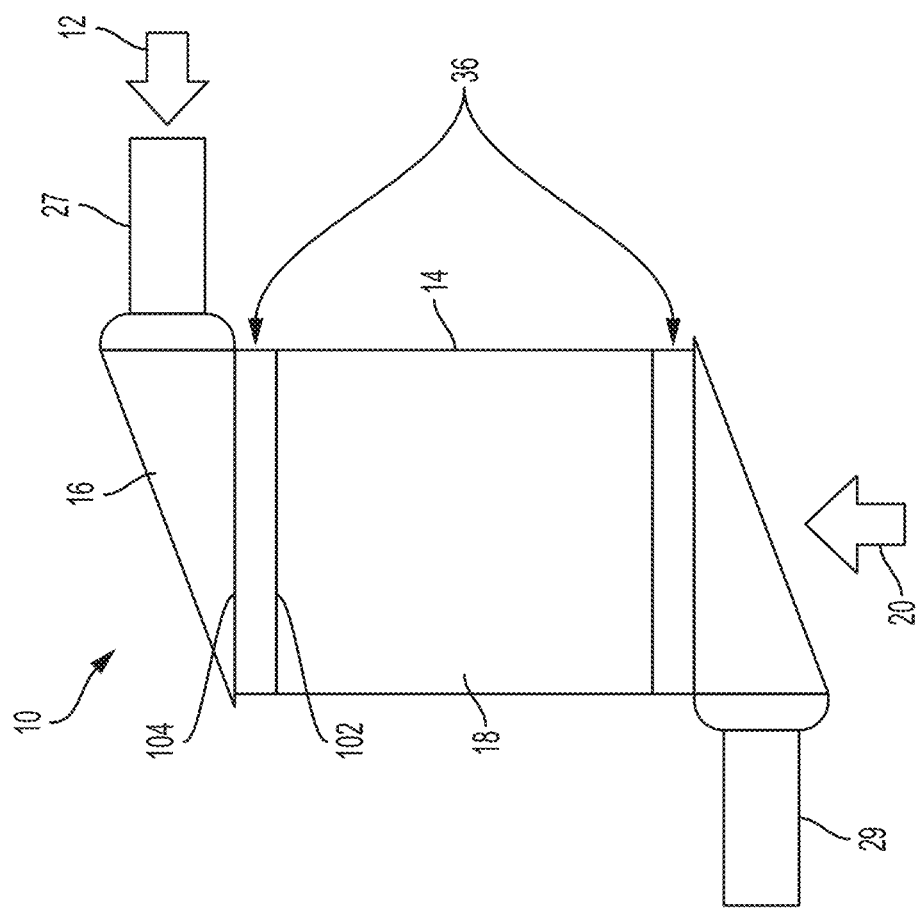
FIG. 8 is a schematic illustration of the heat exchanger according to another aspect of the disclosure.

Referring to FIG. 8, an embodiment of the heat exchanger 10 includes a core face 102 of the core section 14 that is oriented perpendicular to the channels 34. In such an embodiment, the transition region 36 includes an interface 104 with the tent section 16 that is parallel to the interface with the core face 102.

Some embodiments of the slots 30, 32 include vanes to further manipulate the fluid flow and/or to form individual channels. This splitting process can be repeated as many times as needed based on the particular application of use. Additionally, the gradual splitting process may be reversed at an outlet side of the channels 34 to gradually merge the fluid flow. Specifically, groups of the channels 34 are fed to a respective slot at the outlet side with an outlet side transition region.

The embodiments described herein gradually change (e.g., increase) the channel size from the inlet to the core section 18 by splitting the fluid flows, and subsequently merging the fluid flows to gradually change the channel size from the core section 18 to the outlet. This reduces the pressure drop. The flow area typically increases near the core section 18 so having the larger channels at the inlet, where the total flow area is small relative to the core section 18 (and velocities higher relative to core section), thereby mitigating the pressure drop due to the larger hydraulic diameter. To provide context for this advantage, doubling the hydraulic diameter decreases the pressure drop by more than three times. In addition to reducing the pressure drop, the stress of the overall assembly is reduced. The gradual change in heat transfer area and thermal capacitance (from gradually thinning walls) mitigates stress generated from thermal expansion. Acceleration and vibration stresses are also reduced due to the increased section modulus of the taller layers. The splitting and merging embodiments is highly symmetric which guarantees good flow distribution and may provide direct line-of-sight between the slots and at least part of each channel for fluid limiting pressure drop. Additionally, the mass of the heat exchanger 10 is reduced, as the number of rows of the slots 30, 32 is less than the number of rows of the core section 18.

As described above, various types of heat exchangers may benefit from the embodiments described herein. In the case of a heat exchanger formed by an additive manufacturing process, the process may include monolithically forming the heat exchanger with any suitable process, such as powder bed fusion (e.g., direct metal laser sintering, selective laser sintering, etc.) and electron beam melting, for example.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A heat exchanger comprising:
   a core section defining a plurality of first fluid channels and a plurality of second fluid channels;
   a header section defining a plurality of first fluid layers and a plurality of second fluid layers; and
   a transition region located between the header section and the core section,
   the transition region fluidly coupling the plurality of first fluid layers to the first fluid channels,
   each of the first fluid layers routing a first fluid to a respective group of first fluid channels,
   wherein at least one of the first fluid layers is centrally aligned with a first row of first fluid channels to route the first fluid to all of the channels of the first row and to route the first fluid to a portion of a first adjacent row of first fluid channels and to a portion of a second adjacent row of first fluid channels, and the portion of the first adjacent row and the second adjacent row is half of the channels of the first and second adjacent row.

2. The heat exchanger of claim 1, wherein the first fluid layers and the second fluid layers are slots.

3. The heat exchanger of claim 1, wherein each of the first fluid channels or the second fluid channels have a circular cross-sectional geometry.

4. The heat exchanger of claim 1, wherein each of the first fluid channels or the second fluid channels have a rectangular cross-sectional geometry.

5. The heat exchanger of claim 1, wherein the plurality of first fluid layers gradually increase the cross-sectional area of fluid flow provided to the first fluid channels.

6. The heat exchanger of claim 1, wherein the heat exchanger is formed with an additive manufacturing process.

7. The heat exchanger of claim 1, wherein the heat exchanger is a counter flow heat exchanger.

8. The heat exchanger of claim 1, wherein the heat exchanger is a parallel flow heat exchanger.

9. The heat exchanger of claim 1, wherein the transition region includes at least one wall isolating the first fluid from the second fluid.

10. The heat exchanger of claim 1, further comprising an outlet side transition region fluidly coupling the respective group of fluid flow channels to a first fluid layer.

11. A method of managing fluid flow in a heat exchanger comprising:
   routing a first fluid from a pipe inlet of a core of the heat exchanger to a plurality of first fluid layer; and
   routing the first fluid from each first fluid layer to a respective plurality of first fluid flow channels,
   wherein routing the first fluid from each first fluid layer to the respective group of first fluid flow channels comprises:
   routing the first fluid from one of the first fluid layers to an entire row of first fluid channels and to a portion of channels of a first adjacent row and to a portion of a second adjacent tow of channels, and
   wherein the portion of the first adjacent row and the second adjacent row is half of the channels of the first and second adjacent row.

12. A method of manufacturing a heat exchanger comprising,
   additively manufacturing a core section, a header section and a transition region,
   the core section defining a plurality of first fluid channels and a plurality of second fluid channels,
   the header section defining a plurality of first fluid layers and a plurality of second fluid layers, and
   the transition region located between the header section and the core section,
   the transition region fluidly coupling the plurality of first fluid layers to the first fluid channels,
   each of the first fluid layers routing a first fluid to a respective group of first fluid channels,
   wherein at least one of the first fluid layers is centrally aligned with a first row of first fluid channels to route the first fluid to all of the channels of the first row and to route the first fluid to a portion of a first adjacent row of first fluid channels and to a portion of a second adjacent row of first fluid channels, and the portion of the first adjacent row and the second adjacent row is half of the channels of the first and second adjacent row.

* * * * *